United States Patent [19]
Gazis et al.

[11] Patent Number: 5,793,705
[45] Date of Patent: Aug. 11, 1998

[54] ULTRASONIC LIQUID LEVEL GAUGE FOR TANKS SUBJECT TO MOVEMENT AND VIBRATION

[75] Inventors: Denos Constantinos Gazis, Katonah; William Francis Kane, Florida; Robert Jacob von Gutfeld, New York, all of N.Y.

[73] Assignee: International Business Machines Corporation, Armonk, N.Y.

[21] Appl. No.: 710,454

[22] Filed: Sep. 18, 1996

[51] Int. Cl.$^6$ ............................................. G01S 15/00
[52] U.S. Cl. ............................................. 367/98; 367/908
[58] Field of Search ........................... 367/908, 98, 902; 73/290 V; 340/621

[56] References Cited

U.S. PATENT DOCUMENTS

| | | | |
|---|---|---|---|
| 4,427,132 | 1/1984 | Thomson | 73/290 V |
| 4,821,569 | 4/1989 | Soltz | 367/908 |
| 5,035,140 | 7/1991 | Daniels et al. | 73/290 V |
| 5,053,978 | 10/1991 | Solomon | 364/550 |
| 5,065,624 | 11/1991 | Fell | 73/290 V |
| 5,131,271 | 7/1992 | Haynes et al. | 367/908 |
| 5,150,334 | 9/1992 | Crosby | 367/902 |
| 5,157,639 | 10/1992 | Leszczynski | 367/908 |
| 5,309,763 | 5/1994 | Sinclair | 367/908 |
| 5,315,563 | 5/1994 | Lichtenfels, II et al. | 367/908 |
| 5,319,972 | 6/1994 | Oblak et al. | 73/290 R |
| 5,319,973 | 6/1994 | Crayton et al. | 367/908 |
| 5,379,658 | 1/1995 | Lichtenfels, II et al. | 73/866.5 |
| 5,400,376 | 3/1995 | Trudeau | 73/290 V |

*Primary Examiner*—Daniel T. Pihulic
*Attorney, Agent, or Firm*—Whitham, Curtis & Whitham; Stephen Strunck

[57] ABSTRACT

One or more high-frequency ultrasonic transducers are used to measure the liquid level of tanks containing any type of fluid, but fuel in particular. The invention relates specifically to tanks that are subject to movement and vibration which generally makes the use of ultrasonic echoes unreliable for obtaining accurate level measurements. A special algorithm is used to obtain the temporal center of the distribution of echo arrival times over a preset time interval. From this temporal center of an echo distribution, the liquid level is readily obtained through the acoustic velocity, time and distance relationship. An annular piezoelectric plate, independently driven at low ultrasonic frequencies (kHz range), mounted on the tank bottom surrounds the high frequency ultrasonic transducer. The function of the piezoelectric plate is to send out propagating ultrasonic waves (essentially longitudinal) to maintain the tank area in the immediate region of the high-frequency transducer free from debris and sediment deposits at the bottom of the tank thereby avoiding the uncertainty in the measurement that is introduced by debris on the tank bottom.

31 Claims, 6 Drawing Sheets

ULTRASONIC LIQUID LEVEL GAUGE FOR TANKS SUBJECT TO MOVEMENT AND VIBRATION

FIELD OF THE INVENTION

The invention relates generally to the use of ultrasonic echoes to measure liquid levels in storage containers, particularly fuel levels in tanks subject to movement and vibration. The invention utilizes temporal averaging of the reflected acoustic wave to obtain accuracies not obtainable from ultrasonic gauges previously known. In addition, means are provided for maintaining a clean tank surface locally to avoid false readings due to the accumulation of sediment and debris precipitating over time from the liquid. Such debris cause both attenuation and additional time delays of the echo arrival time.

BACKGROUND OF THE INVENTION

Applications using ultrasonics to determine the thickness of solids and the height of liquids are well known. However, for the case of liquids stored in tanks subject to vibration or movement as well as hostile environments, it becomes difficult if not impossible to measure liquid levels with any degree of accuracy. In fact, for some vehicles such as diesel locomotives, airplanes and helicopters, reliable fuel gauges are presently not available. For diesel locomotives, the standard means for obtaining reliable fuel level measurements requires bringing the locomotive to a full stop and using a dip stick as a level marker. In numerous aeronautic vehicles, fuel tanks are generally filled before takeoff. Computer calculations based on an airplane's approximate load and distance travelled are made to determine the amount of fuel remaining in the tank as the flight proceeds. These calculations, however, are subject to considerable uncertainty which have at times led to unfortunate results including fatal loss of aircraft due to lack of fuel. Existing mechanical and electronic fuel level gauges for planes and trains are generally considered unreliable so that better schemes are very much in demand.

U.S. Pat. No. 5,315,563 and 5,379,658 to Lichtenfels et al., describe a fuel gauge using ultrasonics, specifically addressing ways of mounting the ultrasonic transducer both within and outside of the tank. The purpose of the invention is to provide a simple mounting scheme along with means for disassembling the transducer and its mount for maintenance. Included also is the use of a stillwell for capturing some fluid in a cylindrical region encompassing the acoustic wave in order to minimize swashing and the accompanying distortion of the echo pattern. No method or application is described for obtaining accurate data when the tank or liquid is in motion or subject to vibration.

U.S. Pat. No. 5,309,763 to Sinclair et al., describes an embodiment comprising a vertically mounted tube with holes to allow liquid flow into the tube. The tube has reflectors mounted at different heights from which ultrasonic echoes can be reflected. A comparison is made between the echo from the uppermost submerged reflector and the liquid-air interface. These echoes are processed to determine the actual liquid level, albeit approximate. The echoes from the various vertically mounted reflectors can also be used to determine the ultrasonic velocity of the liquid as a function of height. This permits an average velocity to be determined and accounts for stratification and velocity variation with temperature of the liquid. No means are provided for averaging the velocity due to vibration or swashing of the liquid.

U.S. Pat. No. 5,053,978 to Solomon describes the use of an acoustic transducer mounted from the top of a stationary fuel storage tank with the sound directed through the air space onto the liquid to obtain the depth of liquid (fuel). The invention includes means for collecting additional tank data relating to the tank's condition using additional sensors. These data can be used for purposes such as automated calls to a service agency for needed boiler maintenance or fuel refill.

U.S. Pat. No 4,821,569 to Soltz et al., describes a liquid level meter using ultrasonic echoes from an air-liquid interface and means for discriminating and rejecting false or parasitic echoes. Such echoes can arise from walls of the container, for example. A time window is provided which allows a comparison between the real echo and the false echo, the false echo generally taking more or less time in its roundtrip path. Thus, if the echo does not fall within the prescribed time window, means for rejecting it are described. If values occur consecutively for a pre-set number of times within the time window, they are accepted as the new true reading.

U.S. Pat. No. 5,131,271 to Haynes et al., describes the use of an ultrasonic level detector that uses a comparator to determine whether a signal from a pulse echo is sufficient in amplitude to be recorded as valid. The ultrasonic transmitter/receiver is mounted at the top of the tank and measures the time of flight of the echo as it is reflected from the air/liquid interface. Also generated is a time window during which a received signal can be accepted below a certain set level. Outside of this time window, signals can be accepted that are higher in intensity or exceed a certain threshold. The system is connected to a computer and amplifier circuit, the latter in turn connected to a gain table to adjust the amplituides accepted by the computer to be counted as valid for determining the level of the tank.

U.S. Pat. No. 5,319,972 to Oblak et al., describes a specific application that measures the liquid level in a reactor but can be used for other purposes. Echo signal heights are averaged over time and the various signals are put into time bins. The earliest arriving signal is used to determine the liquid level, but background pulses are analyzed to make sure that the the foreground signal is the true signal representing the correct arrival time. Means are provided for setting different levels of the arriving signals to ascertain their validity. There is no time averaging performed to determine the correct arrival time from the histogram that develops from the array of recorded arrival times.

An ultrasonic method for measuring liquid height where the signal from the transducer is reflected from a float rather than the air-liquid interface is described in U.S. Pat. No. 5,319,973 to Crayton et al. Also described is a means for monitoring the temperature of the liquid to correct for ultrasonic velocity temperature dependence. This has certain advantages over the more conventional manner of echo reception but there is no indication it would work in liquid environments subject to vibration and splashing.

U.S. Pat. No. 5,400,376 to Trudeau describes means specifically designed for measuring fuel levels in aircraft fuel tanks using a large number of independent sensors. Each sensor is located at a different location within the tank to give a multiplicity of readings, each of which is recorded and stored. From the multiplicity of readings given by the logic counter, a level can be determined. The problem of how these data are correlated to take into account shaking and vibration of the tank are not described nor does the patent describe specific solutions to that problem.

In general, when fuels and many other liquids are kept in storage for any length of time, a buildup of debris will occur at the bottom of the tank. This buildup can greatly interfere with ultrasonic measurements in that the debris attenuates the ultrasonic wave. Also, the irregular surface tank bottom surface which is likely to result distorts the echo pattern both spatially and temporally. None of the above-cited art describes a means for accurately obtaining liquid levels for the case where the liquid is vibrating or in motion using a computer algorithm in combination with ultrasonic echo techniques. None of the cited art describes means for eliminating debris and sediment that occurs from liquids such as fuel oils in storage tanks. Thus, the techniques of the cited art are incapable of determining liquid levels with any degree of accuracy using the echo technique, especially in environments where vibration and shaking of the liquid are present.

It is extremely important for essentially all moving vehicles to keep track of fuel levels. Aside from the dangers inherent in running out of fuel it is important for diesel locomotives, for example, to know at what location fuel should be taken on. With accurate fuel level data, a decision could be made by a central tracking station as to where to stop for refueling to obtain the best or lowest available fuel cost, consistent with the fuel remaining in the engines, thereby giving rise to substantial cost savings. For example, one railroad estimates that for their 3000 locomotive fleet, an effective 1 cent/gallon fuel cost reduction could result in a $6 million saving per year.

SUMMARY OF THE INVENTION

The present invention uses a continuous or quasi-continuous signal averaging technique to present a distribution of echo signals as a function of time from which liquid levels can be accurately determined and monitored on a continuous or quasi-continuous basis. Several averaging methods are described from which the temporal center of the distribution can be determined, this time representing that of the undisturbed or true liquid level. A means for preventing debris collection in the region of the echo transducer is provided in order to ensure level height accuracy by preventing attenuation and distortion of the ultrasonic wave.

One or more ultrasonic transducers are firmly mounted on the bottom of a fuel tank (tightly coupled acoustically) to transmit and receive acoustic pulses. At least one transducer is surrounded by a piezoelectric (piezo) annular plate which operates at low ultrasonic frequencies, typically on the order of 10–50 kHz, to maintain a local region of the bottom of the tank free from debris such as fuel sediment, algae growth etc. The received echo pulses are preferably rectified and filtered prior to processing by a channel analyzer or boxcar integrator. With a convenient pulse repetition rate on the order of 1000 pps it is possible to obtain ultrasonic echoes which will, however, vary in amplitude and also have a temporal distribution in their arrival time due to vibration and/or movement of the tank causing splashing of the liquid within the tank confines. Signal processing is used to determine the center of the echo arrival time from the arrival time distribution. This computed time is used by a computer to obtain the level height of the tank after temperature corrections have been made to the velocity of the acoustic wave in the liquid using one or more thermocouples or similar thermal sensors in the liquid connected to the computer. Thermal corrections are made to the acoustic velocity based on data stored in the computer's data file. A measure of the sediment level can also be obtained by comparing the echo signals with a transducer mounted without the annular piezo plate or from a transducer where the piezo plate is not activated. Signals from this transducer will have a delayed arrival time from which a thickness of sediment can be approximated knowing the acoustic velocity in the sediment medium.

BRIEF DESCRIPTION OF THE DRAWINGS

The invention will be more fully understood and further advantages will become apparent when reference is made to the following detailed description of the preferred embodiments of the invention and the accompanying drawings in which.

DETAILED DESCRIPTION OF THE INVENTION

Figure 1:
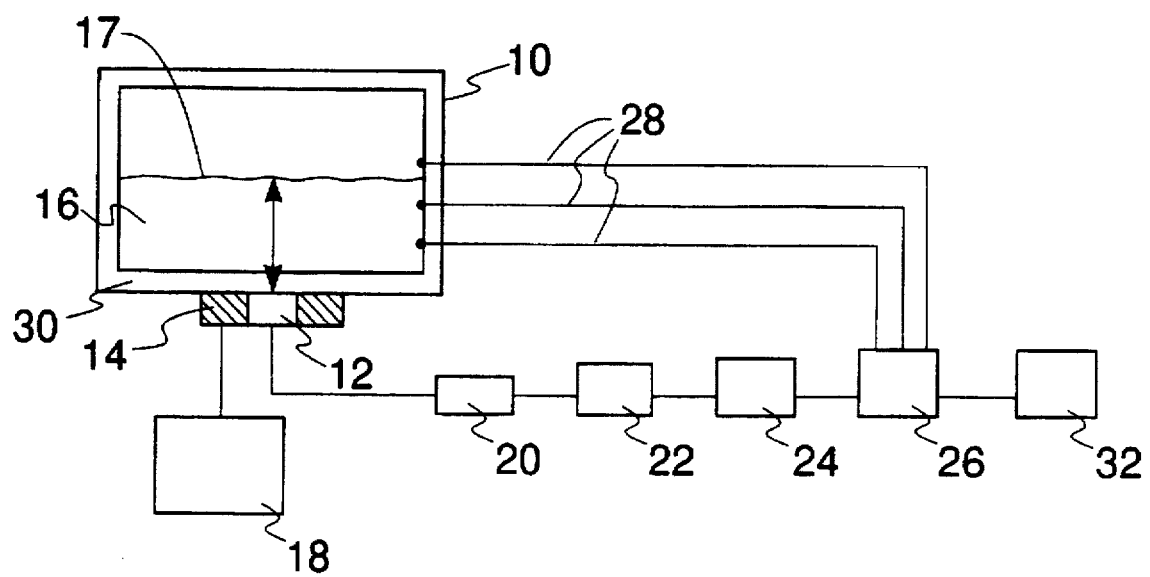
FIG. 1 is a schematic diagram of a tank containing a liquid and the equipment associated with the means of the invention for providing accurate measurement of the level of the fluid.

FIG. 1 depicts a fuel tank 10, typically steel, onto which is mounted a piezoelectric crystal or piezoelectric high frequency transducer 12 typically of a piezoelectric material such as PZT (lead-zirconate-titinate). The preferred frequency operating range for transducer 102 is about 0.5–10 MHz though it is not necessarily limited to that. The pulse repetition rate is preferably in the range of about 500–2000 pulses per second although this, too, is not a strict limitation. The emitted ultrasonic pulse travels through tank wall 30, into liquid 16. The ultrasonic echo reflection of interest occurs at liquid/air interface 17.

A piezoelectric plate 14 preferably in the shape of an annulus, surrounds center mounted echo transducer 12. Circular plate 14 functions as a low frequency transducer to maintain the area in the vicinity of inner transducer 12 free from debris or sediment that can precipitate from the fuel or other liquid 16 stored in tank 10 over a period of time. Annular transducer 14 (also referred to as the transducer plate) consists typically though not limited to PZT material (leadzirconate-titinate) and is designed to resonate in the kHz range, typically 10–50 kHz though not limited to that range. It is connected to its own driver unit 18, which can be controlled independently from transducer 12, and is normally operated in a cw (continuous wave) mode for an interval of time that may, for convenience and best signal to noise purposes, be interrupted during the time that the echoes from high frequency transducer 12 are sampled for level height measurement. Driving unit 18 is not normally equipped with a receiving section. At sufficiently high driving voltages from driver unit 18, a cleaning action occurs from longitudinal vibrations emanating from plate 14 at relatively low frequencies. Acoustic energy densities of a few watts/cm² generally cause sufficient cavitation (sudden bubble collapse within the liquid due to ultrasonic excitation) to keep debris and dirt from collecting on the bottom surface of the tank in the immediate region of the transducer.

Also shown is driver/receiver unit 20, also known as a transceiver, connected to the inner mounted high frequency echo transducer 12. The transceiver 20 consists in part of a voltage pulse unit which applies a periodic voltage pulse to transducer 12 for generating a propagating ultrasonic pulse in a manner well known in the art. In a typical embodiment, the ultrasonic pulse is emitted and the echo sensed by the same transducer, i.e., transducer 12. The pulser unit 20 both sends out the acoustic pulse and receives and amplifies the returning echo. This unit is sometimes referred to in the art as a pitch/catch transceiver whose pulse repetition rate can be varied, typically from 10–1,000 pps and whose variable gain can produce electrical excitation pulses as high as 250 V or greater. To produce the ultrasonic excitation pulse for the high frequency transducer, one typically uses electrical excitation pulse widths on the order of 0.5 microseconds or less. Unit 20 may contain an electronic switch which permits a received echo pattern or return pulse to be sensed by transducer 12 which is amplified by amplifier unit 22. The output of amplifier 22 is connected to a signal averaging unit such as a channel analyzer or a boxcar integrator 24. The output of signal averager 24 serves as the input signal to computer processing unit 26 which computes the received echo amplitude distribution with time.

Figure 2:
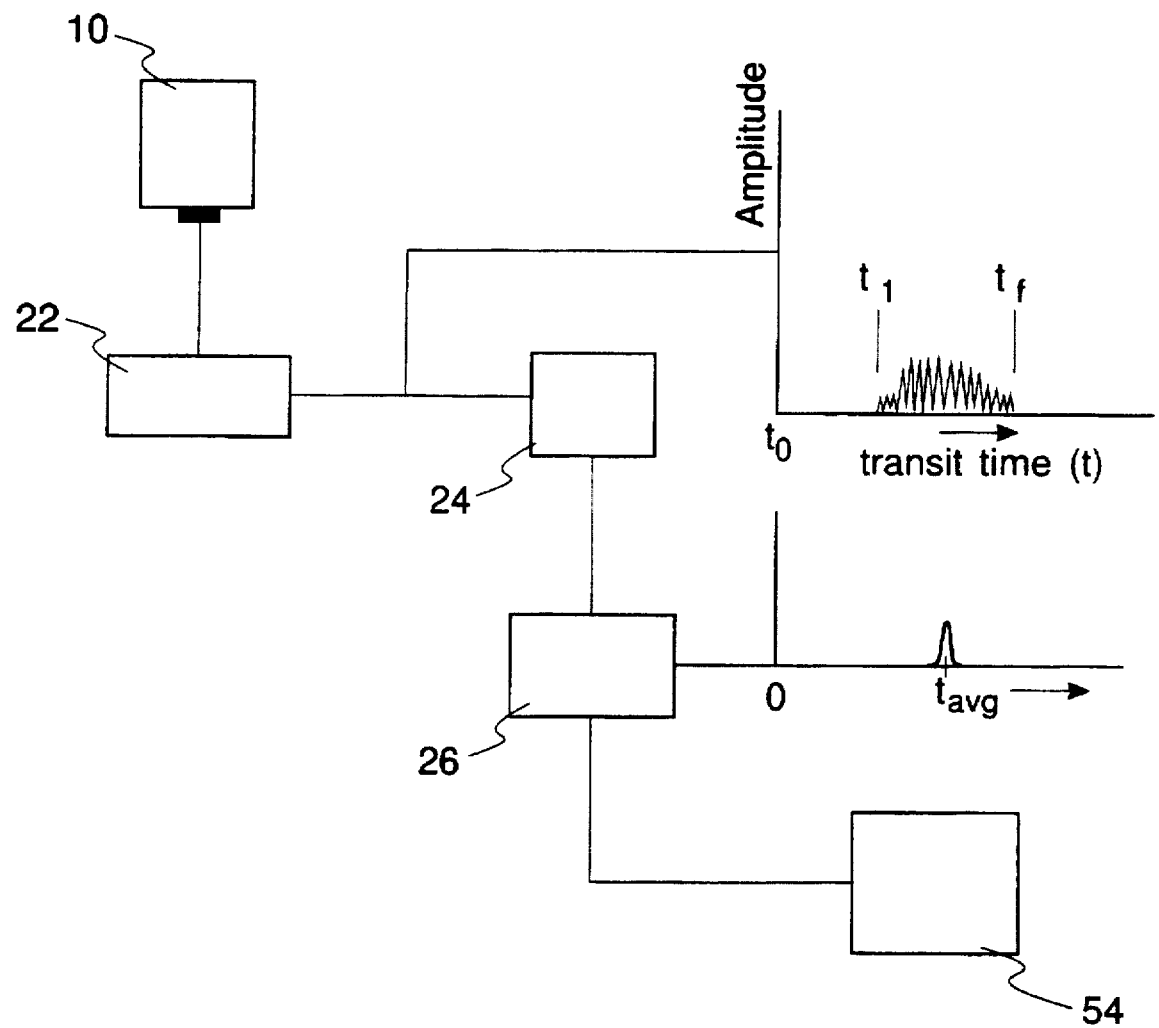
FIG. 2 shows the signal averager, the signals it receives, and a processor unit with a simple local flow diagram to show the interaction of these elements.

In FIG. 2, the input to averager 24 can, for example, be the output of transducer 12 or an amplifier 22 which has amplified the output of transducer 12. A channel analyzer or boxcar integrator are two examples of signal averagers 24 that can be used to obtain the required temporal (time) distribution 50 from which the level height can be determined. The echo signals from the transceiver output is averaged by the signal averager over a predetermined fixed interval of time. For example, echo signals might be averaged over a period of time of from about 5 seconds to 5 minutes using a pulse repetition rate of 1000 pps. Operating with these parameters gives rise to a representative distribution of echoes and echo arrival times (e.g., time to transit a path from the transducer and back from the liquid air interface) when the tank is experiencing motion, vibration or a combination thereof.

A computer algorithm stored in computer 26 processes the output of signal averager 24 in the following way. The center of the temporal distribution is subtracted from the time the ultrasonic pulse was emitted, to, thus corresponding to the time required for the pulse to traverse a roundtrip path in the undisturbed liquid. A quasi-continuous value for the fuel level can be obtained by echo sampling in a quasi-continuous manner as the fuel level decreases with time. More specifically, the mean distribution can be obtained from the following: Consider a set of echoes $A_i(t_i)$. Here $A_i$ is the amplitude of the echo arriving at the receiver at time $t_i$. Over a specified sampling time, the average 52 of the distribution of arrival times, $t_{av}$, is determined from the set of arrival times, irrespective of the amplitude. Thus, the averaged arrival time from which the liquid level can be determined is given by $$t_{av} = t_1 + [(t_f - t_i)/2] \quad (1)$$

where $t_1$ is the first echo to be counted, and $t_f$ is the last echo to be counted in the temporal averaging scheme.

The ultrasonic velocity, v in the liquid can be corrected for temperature, T, using one or more thermocouples 28 in liquid 16 at different level heights along the tank. Thermocouples 28 are connected to computer 26 to provide correction data using the computer's data file of ultrasonic wave velocity as a function of temperature. When several thermocouples 28 are used, the velocity corrections can be made in a step-wise fashion in which case v is v (T). An additional correction is made to the echo transit time, $t_{av}$, to account for the round trip travel time of the ultrasonic pulse through tank wall 30. This correction equals $2D/v_D$ or $\Delta t$ where D is the thickness of tank wall 30 and $v_D$ is the velocity of the ultrasound in tank wall 30. Ultrasonic echoes that occur from multiple reflections from tank wall 30 and other spurious echoes of small amplitude can be rejected by filtering or setting the analyzing receiver (boxcar or channel analyzer 24) to levels such that those echoes below a predetermined nominal amplitude value, Am, or those echoes arriving before a preset time $t_p$ are not accepted by signal averager 24. Then the true height of the liquid, H, in tank 10 is given by $$H = \frac{[v(T)][t_{av} - \Delta t]}{2} \quad (2)$$

The use of the center of the temporal distribution of echo arrival time results in a means for determining the level height based on the statistics of random motion. Generally, vibration and movement of a liquid container cause motion of the liquid surface whose time average is equivalent to that of a stationary surface. For an ultrasonic echo, the liquid top reflecting surface or plane has equal probability of being above or below the true level of the liquid. Under these conditions, the acoustic path lengths are both longer and shorter than that for the the undisturbed liquid. Thus, we find that the true level height lies in between the two extreme paths, that is the shortest and the longest acoustic path length (proportional to the echo arrival times). For completely random motion, the center of the echo arrival time distribution is directly proportional to the actual liquid level height.

Figure 3:
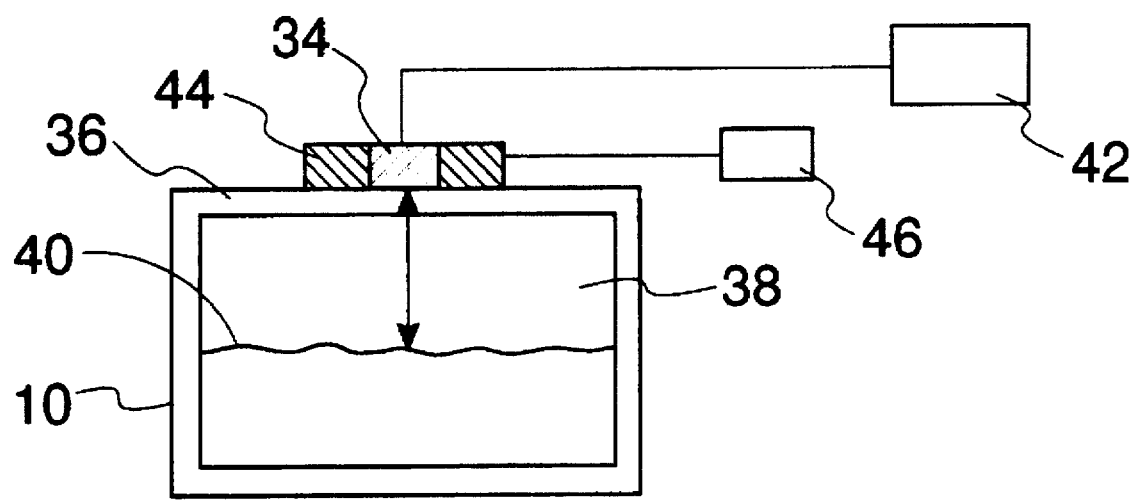
FIG. 3 shows a top mounted transducer with a secondary annular transducer plate whose vibration prevents liquid condensate buildup from interfering with the echo pulse.

Shown in FIG. 3 is transducer 34 which can be utilized in addition to the one mounted on the bottom or can be used as a stand-alone. Transducer 34 is mounted on the top of tank 10. Also shown is circular plate transducer 44, driven by sonic driver 46, which functions in a manner similar to transducer 14, but here is effective in keeping the area surrounding transducer 34 free of condensate. In this embodiment, the ultrasonic pulse travels through upper tank wall 36 and then through a region 38 consisting of air and liquid vapor. Acoustic reflection occurs at air/liquid interface 40, resulting in a return echo which is received by top mounted transducer 34. Transducer 34 must necessarily have a peak frequency considerably lower than bottom mounted echo transducer 12 due to the strong frequency dependent attenuation of sound waves in air above ~150 kHz. For tank top mounted transducer 34, a preferred frequency range would be about 25–100 kHz. The output of transceiver 42 for transducer 34 is processed in a manner similar to the one just described for transducer 12. These data can serve as an additional check on the accuracy of the data from the lower echo transducer or as an independent measure when used as a stand-alone. Top mounted transducer 34 gives a measure of the amount of fuel missing from the full tank, a fixed quantity which translates to a known distance. The difference between the full tank echo arrival time and the echo arrival time after fuel has been used, gives a direct measure of the fuel level from the expression.

$$\Delta h = \frac{(v_{air})(t_{av} - \Delta t)}{2} \quad (3)$$

where $v_{air}$ is the velocity of the acoustic wave in air, $t_{av}$ is calculated in accordance with Equation 1 and $\Delta t$ is calculated as described above. The tank level, h, is then given by the expression, $$h = h_0 - \Delta h \quad (4)$$

where $h_0$ represents the full tank height.

Figure 4:
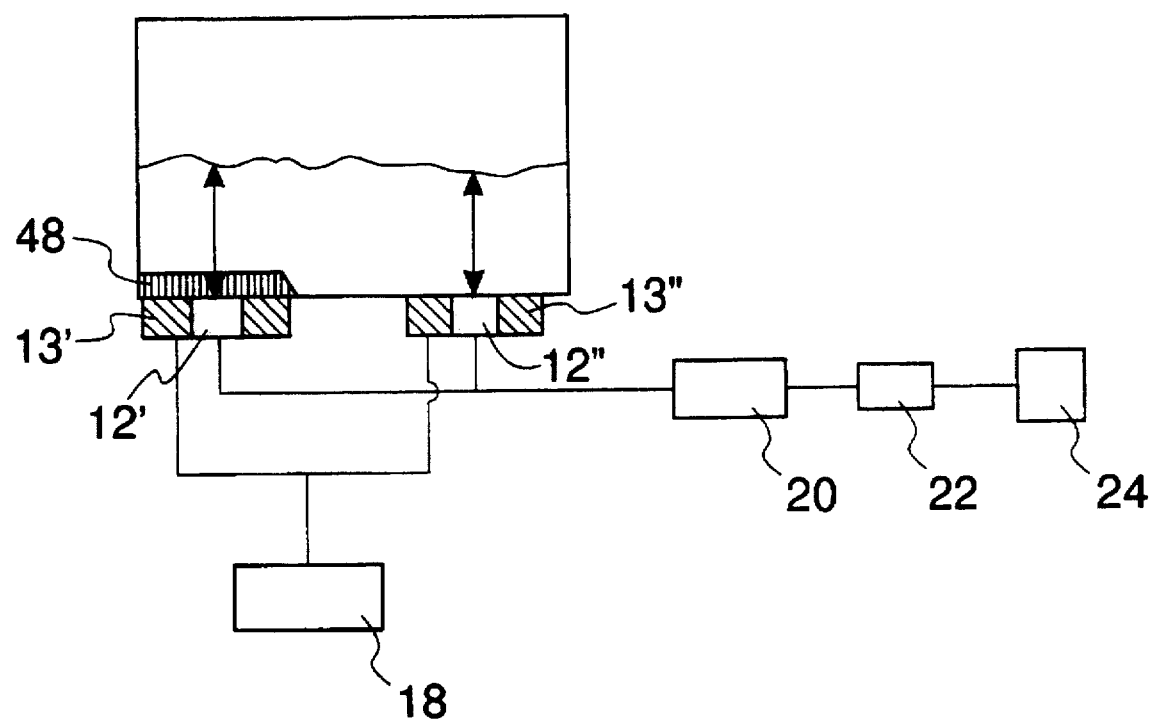
FIG. 4 shows a plurality of ultrasonic transducers with low frequency piezo plates, the echo signals from each transducer being separately or collectively averaged over a selected time interval to improve the ultrasonic amplitude signal averaging.

FIG. 4 shows an embodiment consisting of an array of two (more can be used) transducers 12' and 12" and 13' and 13", both types each operating in the same manner already described for tank bottom-mounted single high frequency transducer 12 and annular plate 13. The arrival times of the echo signals from high frequency array 12', 12" are averaged from each transducer element separately or as a single combined average to provide a more statistically extensive and therefore a more accurate temporal signal average than can be expected from a single unit. Noise will also be reduced using this multiplicity of transducers. The output is used to determine the center of the echo arrival time as previously described. When any one acoustic transducer 12', 12" of the array is arranged to operate for an extended period of time without activation of the surrounding annular piezo plate 13', 13" the ultrasonic wave from that transducer traverses debris 48 that may have collected. The signals from two transducers 12', 12", one with and one without the ultrasonic action of the annular plate may then be used to determine the thickness of debris layer 48 by simple subtraction, that is, $$2d = (v)(t_d) - (v)(t_{nd}) \quad (5)$$

where $t_d$ is the temporally averaged transit time for the echo that has traversed debris layer 48 and $t_{nd}$ is the echo time for the wave traversing a clean tank surface without debris. Here, the assumption is that the ultrasonic (acoustic) velocity in debris 48 is close to that of the velocity in the liquid which, to first order for small layers of debris (small compared to the liquid level) is a reasonable approximation.

The output of signal averager 24 serves as the input to computer 26 which determines the midpoint of the echo arrival time temporal distribution. The computer calculates the height of the fluid from the echo time and velocity of the signal in the fluid medium and any tank wall through which the ultrasonic wave must travel. The time required for averaging is in part determined by the gate width selected on the boxcar or channel analyzer. An offset time can be pre-set so that only a very narrow portion of the time of flight echoes are processed by the integrator, thereby eliminating much unnecessary integration time, that is those times where no echo signal is expected. Also, the operation can be such that the entire system is only operated at selected times since a continuous readout is not required for reasonable updated information.

The output of computer 26 can be connected to any of a number of readout displays 54 such as a dial gauge, a digitized readout, or a chart recorder. The data may also be kept in the computer memory as a permanent or semi-permanent record. Data taken when the tank is quiescent may be stored in the computer and used as a reference level for comparison with data taken at later times.

Figure 5A:
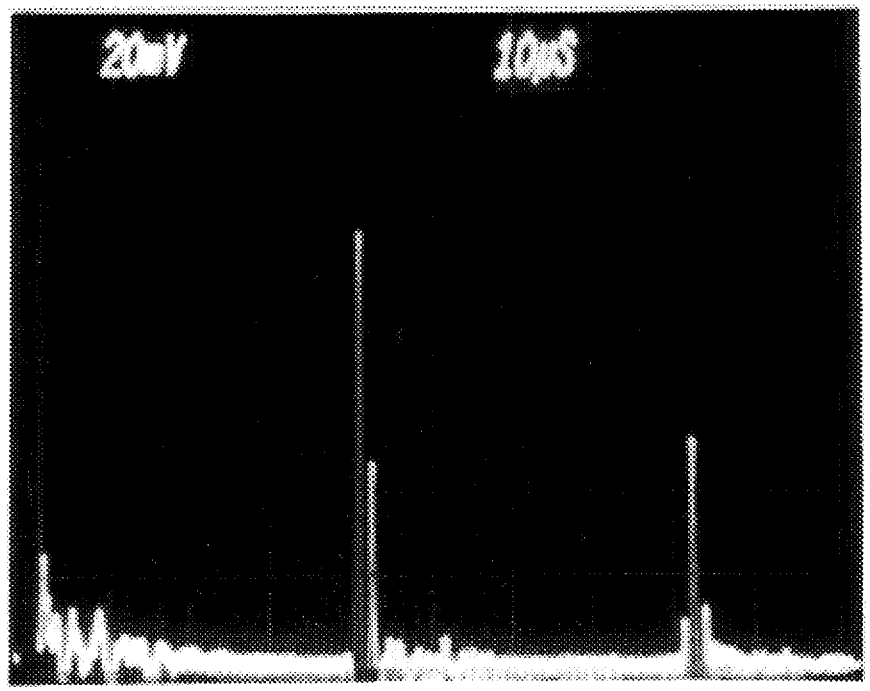
FIG. 5 shows oscilloscope traces of 1 MHz acoustic echoes obtained experimentally from water A) that is quiescent and B) undergoing agitation with sidewall splashing.

Ultrasonic echo experiments were performed with water to verify the concepts of the invention. Echoes were measured traversing water in a flat bottomed container 95 mm in height, 45 mm in diameter, 2 mm wall thickness with the the water level 32 mm in height. Data were taken with the water both in a static (quiescent) and highly agitated state. Agitation was provided by motion of a flat paddle using a back and forth movement of 2-3 cycles per second. A PZT Panametrics transducer (Model VIP 0.75" diameter) centered at 1 MHz was swaged to the bottom of the container to transmit ultrasonic waves into and back out of the liquid. A Panametrics pulser-receiver unit (Model 5050 PR) was used for pulsing and receiving the echoes. The echoes in turn were monitored on a Tektronix 7704A oscilloscope using a Tektronix Model 7A22 plug-in unit. The echoes were recorded on film from the oscilloscope using a camera with time exposure of approximately 7 seconds of agitation. The center of the distribution was determined by measuring the time of the first significant amplitude of the echo and last arrival of such echoes. Data are shown for both the static and agitated states of the liquid. FIG. 5A and B respectively.

In FIG. 5A, signals are recorded for multiple echoes arriving at times equal to the round trip of the ultrasonic signal through both the container wall and water. Since there is no agitation here, the signals arrive at the same time for each pulse so that there is a superposition of essentially all the pulses arriving for seven seconds at 1000 pps, with an arrival time of approximately 43 microseconds. Because the liquid is quiescent, there is only one arrival time rather than a distribution of arrival times. The observed time corresponds to the roundtrip time of the ultrasonic pulse through the container wall and the liquid. In addition, the second echo with an arrival time of approximately 84 microseconds for two roundtrip paths in the acoustic media are also shown.

The liquid level height is determined from the velocity in the two media and the known thickness of the container wall as follows. The time to travel in the wall (0.3 cm thick) is 0.3 cm/$5.64 \times 10^5$ cm/sec where $5.65 \times 10^5$ cm/sec is the speed of the pulse in the wall. This is equal to 0.5 μs. The round trip time is twice this and equals $\Delta t$ which is 1 μs. Thus, for the first echo, with ultrasonic velocity in the liquid equal to $1.53 \times 10^5$ cm/sec, $$H = \frac{[1.53 \times 10^5 \text{ cm/sec}][43 \text{ μs} - 1 \text{ μs}]}{2} = 3.15 \text{ cm}$$

For the second echo, from acoustic impedance arguments, it can be shown that the reflection for the second echo takes place at the liquid-wall interface. Therefore, the ultrasonic wave has only traversed the wall thickness once, i.e. 1 roundtrip, so that $\Delta t$ is still only 1 μs as before and $$H = [(1.53 \times 10^5 \text{ cm/sec})(84 \text{ μs} - 1\text{μ})]/4 = 3.17 \text{ tm}$$

Figure 5B:
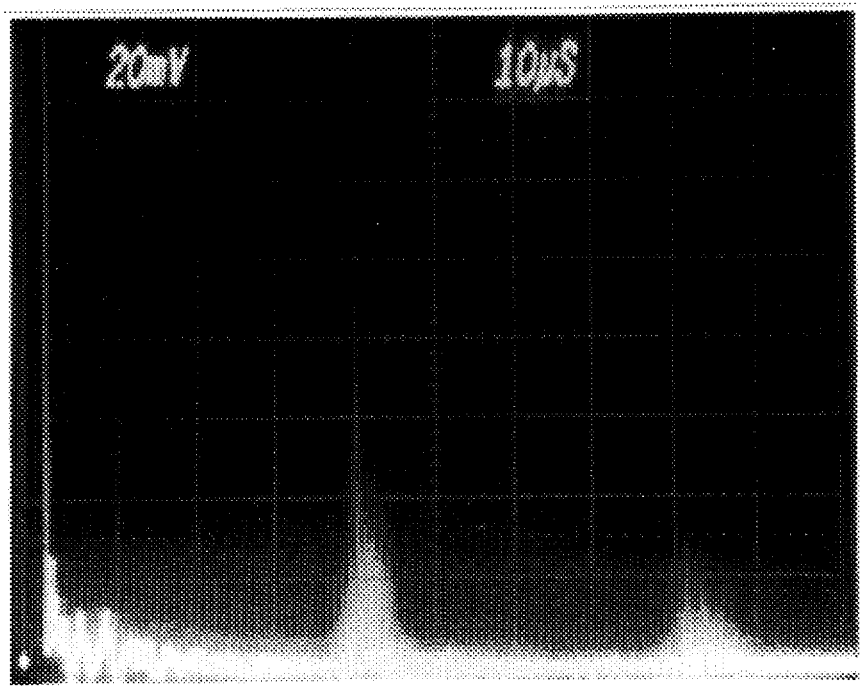

Upon continuous random agitation of the liquid in the container, a distribution of signals is observed, FIG. 5B. The first echo arrival interval ranges from about 39 to 48 microseconds and the second arrival interval from about 78 to 90 microseconds. The first echo signal distribution is centered at about 43.5 microseconds, a time corresponding to the first peak signal of FIG. 5A, that is the quiescent liquid. The second echo signal distribution is centered at about 84 microseconds.

For the agitated liquid, the height H of the liquid is $$H = \frac{|1.53 \times 10^5 \text{ cm/sec}||43.5 \text{ μs} - 1 \text{ μs}|}{2} = 3.25 \text{ cm}$$

for the first temporal echo distribution and $$H = |1.53 \times 10^5 \text{ cm/sec}| \frac{|84 \mu s - 1 \mu s|}{4} = 3.17 \text{ cm}$$

for the second temporal echo distribution

Thus, the innovative method of the present invention of temporal averaging of the echo signal for an agitated liquid can be used to determine the level of the quiescent state.

In yet another experiment, with a water height of only ~1.5 cm, a test was made to observe the effect of a layer of sediment on the bottom of the tank, simulated by a highly uneven, rough layer of rubber cement with a maximum thickness of 0.7 mm. Echo patterns for both still and agitated water were again found to be quite discernible with approximately a factor of two diminution in amplitude of the 1st and 2nd echo signal compared to that for a smooth inner surface bottom. Again, the temporal distribution of echo signals for the agitated liquid case was found to be centered about the time corresponding to the signal for the quiescent liquid.

In general, echoes which result only from the tank wall and from reflections from any solidified or highly viscous material at the bottom of the tank will be constant with time. The signal averager can be set to record only those signals that have time and/or amplitude variations on the scale of many microseconds to milliseconds (depending on the liquid level height) thereby ignoring multiple wall reflections which occur on a sub-microsecond time scale for steel tank wall thicknesses on the order of 1 to 2 cm.

In another embodiment the channel analyzer and/or the box car integrator can be exchanged for an oscilloscope with a buffer memory. A single echo transducer whose output has been filtered and amplified is connected to the input of the memory scope to record a continuous stream of echoes for a given pre-set time duration duration. A cursor is set automatically by computer control or manually to the center of the temporal echo distribution from which the liquid level height is readily determined by techniques already described. After a preset sampling time, the buffer scope memory is cleared for the next set of echoes, either manually or by computer control. A feedback loop is provided to give instructions to the signal averager as to when and over what time interval signal processing is to take place.

Figure 6:
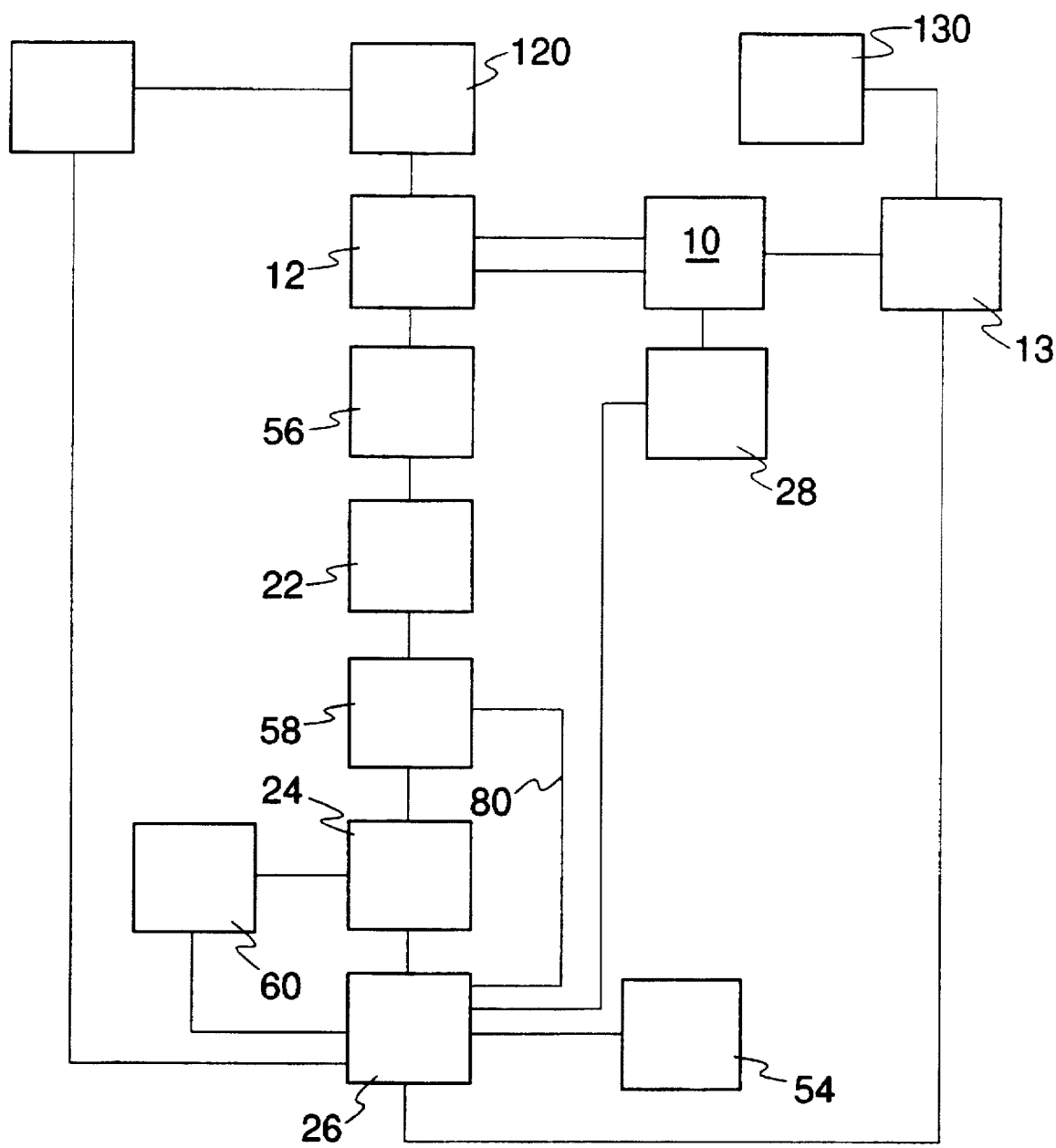
FIG. 6 is a flow chart illustrating the interrelated steps required in making an ultrasonic liquid level measurement in accordance with the invention.

The flow chart in FIG. 6 illustrates the steps required to find the time average for the most accurate value of the liquid level of the tank. Transceiver 120 excites transducer (s) 12. The echo signal is directed back to transceiver 120, filtered by filter 56, then amplified by amplifier 22. The output of amplifier 22 is connected to a limiter 58 which determines what amplitude and what temporal signals to include in signal averager 24. The instructions to limiter 58 are given by computer 26 via feedback loop 80. The echo signals are gated by gate 60 to reject those signals arriving in the microsecond time regime since these signals result from multiple tank wall echoes and are not meaningful in determining the center of the distribution of echo arrival times. Computer 26 provides the algorithm for determining the temporal distribution of the echoes and the mean arrival time based on the temporal average. The level is displayed on display 54. A further feature of the algorithm is that it calculates the liquid level height based on the arrival time and the velocity data stored in the computer. The velocity is corrected with the aid of the thermocouple reading(s) from thermocouples 28 to take into account the velocity dependence on temperature.

Annular piezo-plate 13 surrounding echo transducer 12 is caused to oscillate in a cw or quasi-cw mode at a low frequency (kHz range) from a separate driver unit 130 to provide and maintain a clean tank surface, free of debris in the region of at least one pulse echo transducer. The on/off operation of driver unit 130 is controlled by computer 26. Computer 26 also controls the repetition rate and pulse amplitude of transceiver 120.

While the invention has been described with respect to preferred embodiments thereof, it will be appreciated by those having skill in the art that variations may be made in the invention without departing from the spirit and scope of the invention.

We claim:

1. An ultrasonic echo system for measuring and determining a height of a liquid in a storage vessel, said system comprising:
   an ultrasonic transducer mounted on the bottom of the vessel;
   an ultrasonic pulse unit for causing said transducer to emit ultrasonic pulses and for receiving echoes of said ultrasonic pulses;
   means for processing said received echoes to determine a center of a distribution of the received echoes as a function of time; and
   means for determining a liquid level height based on a velocity of the ultrasonic pulses in said liquid and a time of said center of said distribution
   wherein said means for determining performs an averaging of two of echo arrival times within a predetermined time interval to determine said liquid level height, independent of an amplitude of said echoes.

2. An ultrasonic echo system for measuring and determining a height of a liquid in a storage vessel, said system comprising:
   an ultrasonic transducer mounted on the bottom of the vessel;
   an ultrasonic pulse unit for causing said transducer to emit ultrasonic pulses and for receiving echoes of said ultrasonic pulses;
   means for processing said received echoes to determine a center of a distribution of the received echoes as a function of time;
   means for determining a liquid level height based on a velocity of the ultrasonic pulses in said liquid and a time of said center of said distribution; and
   a second low frequency transducer mounted circumferentially about said ultrasonic transducer, said low frequency transducer emitting low frequency acoustic waves to maintain a clean tank surface.

3. The system of claim 1 further including means for adjusting a time at which said processing is to occur thereby suppressing spurious and unwanted pulse echoes that occur before a preset time interval of interest.

4. The system of claim 1 wherein said ultrasonic transducer operates in the megahertz frequency range.

5. The system of claim 4 wherein said transducer operates in the frequency range of from about 0.5 MHZ to about 10 MHZ.

6. The system of claim 4 wherein said low frequency transducer operates in the kilohertz range.

7. The system of claim 6 wherein said low frequency transducer operates in the frequency range of from about 10 kHz to about 50 kHz.

8. An ultrasonic echo system for measuring and determining a height of a liquid in a storage vessel, said system comprising:
   an ultrasonic transducer mounted on the bottom of the vessel;

an ultrasonic pulse unit for causing said transducer to emit ultrasonic pulses and for receiving echoes of said ultrasonic pulses;

a second independently driven, low frequency transducer mounted circumferentially about said ultrasonic transducer, said low frequency transducer emitting low frequency acoustic waves to maintain a clean tank surface; and means for determining a liquid level height based on a velocity of the ultrasonic pulses in said liquid and a time of a center of a distribution.

9. The system of claim 8 further including means for adjusting a time at which said processing is to occur thereby suppressing spurious and unwanted pulse echoes that occur before a preset time interval of interest.

10. The system of claim 9 wherein said ultrasonic transducer operates in the megahertz frequency range.

11. The system of claim 10 wherein said transducer operates in the frequency range of from about 0.5 MHZ to about 10 MHZ.

12. The system of claim 8 wherein said low frequency transducer operates in the kilohertz range.

13. The system of claim 12 wherein said low frequency transducer operates in the frequency range of from about 10 kHz to about 50 kHz.

14. An ultrasonic echo system for measuring and determining a height of a liquid in a storage vessel, said system comprising:

a plurality of ultrasonic transducers mounted on the bottom of the vessel;

an ultrasonic pulse unit for causing said transducer to emit ultrasonic pulses and for receiving echoes of said ultrasonic pulses means for processing said received echoes to determine a center of a distribution of the received echoes as a function of time; and means for determining a liquid level height based on a velocity of the ultrasonic pulses in said liquid and a time of said center of said distributions, wherein said means for determining performs an averaging of two of echo arrival times within a predetermined time interval to determine said liquid level height, independent of an amplitude of said echoes.

15. An ultrasonic echo system for measuring and determining a height of a liquid in a storage vessel, said system comprising:

a plurality of ultrasonic transducers mounted on the bottom of the vessel;

an ultrasonic pulse unit for causing said transducer to emit ultrasonic pulses and for receiving echoes of said ultrasonic pulses;

means for processing said received echoes to determine a center of a distribution of the received echoes as a function of time;

means for determining a liquid level height based on a velocity of the ultrasonic pulses in said liquid and a time of said center of said distribution; and a plurality of second low frequency transducers mounted circumferentially about said ultrasonic transducers, said low frequency transducers emitting low frequency acoustic waves to maintain a clean tank surface.

16. The system of claim 14 further including means for adjusting a time at which said processing is to occur thereby suppressing spurious and unwanted pulse echoes that occur before a preset time interval of interest.

17. The system of claim 14 wherein said plurality of ultrasonic transducers operate in the megahertz frequency range.

18. The system of claim 17 wherein said plurality of transducers operate in the frequency range of from about 0.5M to about 10 MHZ.

19. The system of claim 15, wherein said plurality of low frequency transducers operate in the kilohertz range.

20. The system of claim 19 wherein said plurality of low frequency transducers operate in the frequency range of from about 10 kHz to about 50 kHz.

21. The system of claim 14 wherein centers of distributions of the received echoes from said ultrasonic transducers are averaged together.

22. The system of claim 15 wherein said plurality of low frequency transducers is one less than said plurality of ultrasonic transducers.

23. The system of claim 22 wherein said one less than is achieved by the physical absence of a low frequency transducer.

24. The system of claim 22 wherein said one less than is achieved by not operating said low frequency transducer.

25. The system of claim 15 further including means for calculating a build-up of debris over the ultrasonic transducer not having an associated low frequency transducer.

26. The system of claim 14 wherein said means for processing includes means for calculating $t_{av}$, where $t_{av}$ is the center of said distribution, in accordance with $$t_{av} = t_1 + [(t_f - t_1)/2]$$

where $t_1$ is a first echo to be counted and $t_f$ is a last echo to be counted.

27. The system of claim 26 wherein said means for determining includes means for determining an ultrasonic velocity of said pulses in said liquid as a function of temperature.

28. The system of claim 27 wherein said means for determining further includes means for calculating said liquid level height in accordance with $$H = \frac{[v(T)][t_{av} - \Delta t]}{2}$$

where $v(T)$ is the ultrasonic velocity in said liquid as a function of temperature and $\Delta t$ is a round trip travel time of said pulses in the vessel wall where $$\Delta t = 2D/v_C$$

and D is a thickness of the vessel wall and VD is the velocity of the ultrasonic pulses in the vessel wall.

29. An ultrasonic echo system for measuring and determining a height of a liquid in a storage vessel, said system comprising:

an ultrasonic transducer mounted on the top of the vessel;

an ultrasonic pulse unit for causing said transducer to emit ultrasonic pulses and for receiving echoes of said ultrasonic pulses;

means for processing said received echoes to determine a center of a distribution of the received echoes as a function of time; and means for determining a liquid level height based on a velocity of the ultrasonic pulses and a time of said center of said distribution, wherein said means for determining performs an averaging of two of echo arrival times within a predetermined time interval to determine said liquid level height, independent of an amplitude of said echoes.

30. An ultrasonic echo system for measuring and determining a height of a liquid in a storage vessel, said system comprising:

an ultrasonic transducer mounted on the top of the vessel;

an ultrasonic pulse unit for causing said transducer to emit ultrasonic pulses and for receiving echoes of said ultrasonic pulses;

means for processing said received echoes to determine a center of a distribution of the received echoes as a function of time; and means for determining a liquid level height based on a velocity of the ultrasonic pulses and a time of said center of said distribution; and a second low frequency transducer mounted circumferentially about said ultrasonic transducer, said low frequency transducer emitting low frequency acoustic waves to maintain a clean top tank surface.

31. The system of claim 29 further including means for adjusting a time at which said processing is to occur thereby suppressing spurious and unwanted pulse echoes that occur before a preset time interval of interest.

* * * * *